United States Patent [19]

Artman

[11] Patent Number: 4,483,291

[45] Date of Patent: Nov. 20, 1984

[54] PROCESS OF SEGREGATING AIR-FUEL MASS IN ENGINE AUXILIARY CHAMBER

[76] Inventor: Noel G. Artman, 15830 Nicklaus La., Sun City, Ariz. 85351

[21] Appl. No.: 460,710

[22] Filed: Jan. 24, 1983

Related U.S. Application Data

[62] Division of Ser. No. 366,446, Apr. 7, 1982, Pat. No. 4,446,831.

[51] Int. Cl.³ .......................... F02B 3/00; F02B 23/00
[52] U.S. Cl. ..................................... 123/286; 123/260; 123/263; 123/275; 123/283; 123/293
[58] Field of Search ............... 123/262, 263, 283, 260, 123/261, 275, 276, 277, 286, 292, 293

[56] References Cited

U.S. PATENT DOCUMENTS

| | | | |
|---|---|---|---|
| 2,884,913 | 5/1959 | Heintz | 123/293 |
| 4,182,280 | 1/1980 | Shekleton | 123/289 |
| 4,224,905 | 9/1980 | Von Seggern | 123/275 |
| 4,320,727 | 3/1982 | Artman | 123/283 |
| 4,320,728 | 3/1982 | Artman | 123/283 |
| 4,327,681 | 5/1982 | Latsch | 123/263 |
| 4,332,224 | 6/1982 | Latsch | 123/263 |

Primary Examiner—Ronald B. Cox

[57] ABSTRACT

A spark-ignition type internal combustion engine having a precombustion chamber auxiliary to the variable volume space in the engine cylinder between the piston and cylinder head. Fuel injected into air in the chamber and fuel-laden air initially entering this chamber from the variable volume space, pursuant to the compression stroke of the piston, form a mixture compressed into a discrete reliably spark-ignitable air-fuel mass within a portion of the chamber where such mass envelops igniter electrodes. A vestibule portion of the chamber causes air, or air mixed with fuel in quantity determinative of engine power output, forced from said space to enter the chamber in a manner compressing and retaining the air-fuel mass in its enveloping relation with the electrodes until ignition occurs.

5 Claims, 9 Drawing Figures

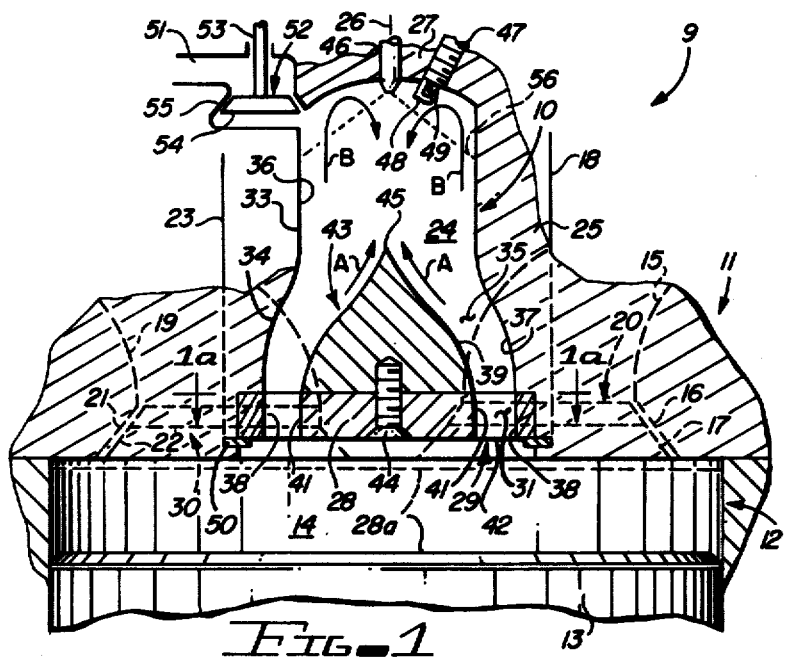
FIG_1
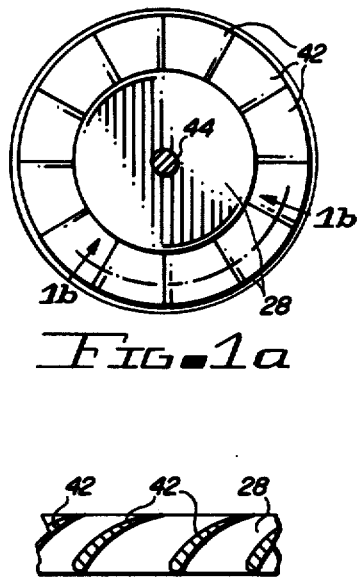
FIG_1a
FIG_1b
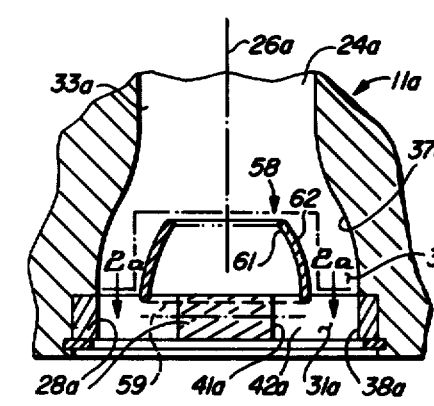
FIG_2
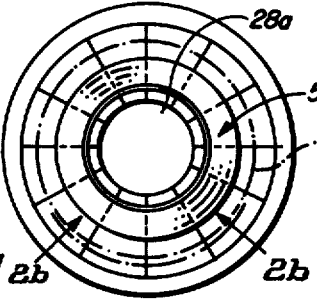
FIG_2a
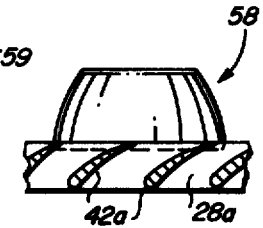
FIG_2b
FIG_5
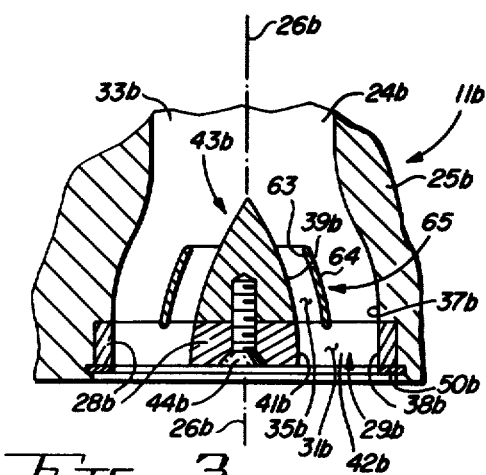
FIG_3
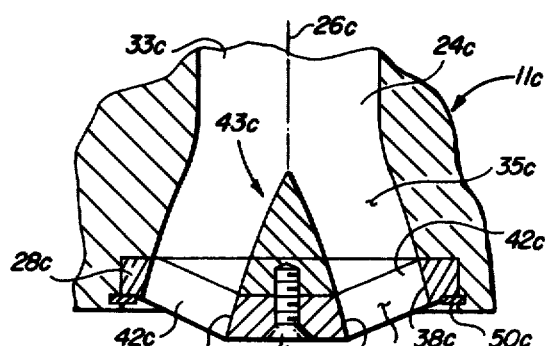
FIG_4

PROCESS OF SEGREGATING AIR-FUEL MASS IN ENGINE AUXILIARY CHAMBER

This is a division of application Ser. No. 366,446, filed Apr. 7, 1982 now U.S. Pat. No. 4,446,831.

SUMMARY OF THE INVENTION

This invention relates to internal combustion engines of the type wherein combustion is initiated in a combustion chamber auxiliary to and comparative with a variable volume space generally corresponding to what is commonly termed the combustion chamber of an orthodox Otto or four-stroke-cycle engine. The invention particularly concerns improvements in the construction and arrangement of parts of the auxiliary chamber (commonly and herein termed precombustion chamber) that control the flow of air from the variable volume space into and within the chamber. This control is in a manner that causes rotation of the chamber-contained air about an axis of such chamber and arrangement of such rotating air into discrete rotating masses occupying respective adjacent positions along said axis. This control of the air makes it possible to mix fuel with one of these masses exclusively of or in greater amount than in the other to create with the one mass an ideal spark-ignitable air-fuel mixture, whereby ensuing combustion occurs more completely in an excess of oxygen existing in the other air mass and with less fuel to produce a given amount of energy under engine idle and part load conditions than if all of the air had received enough fuel to dependably spark-ignite. In this manner the invention provides for not only an improved fuel consumption characteristic but also for dimimution of exhaust gas pollutants. Both air masses are mixable with combustion-sustaining quantities of fuel varying in amount to attain desired engine speed and power.

The species of structure herein disclosed are improvements upon that disclosed in my U.S. patents, U.S. Pat. No. 4,320,727 titled Process of Fuel Stratification Within and Venting of Engine Auxiliary Combustion Chamber, and U.S. Pat. No. 4,320,728 titled Engine Precombustion Chamber with Provisions for Venting Thereof and Fuel Stratification Therein. Details of these improvements and their distinction from the species disclosed in said patents will become apparent from the ensuing description with reference to the appended drawing.

DESCRIPTION OF DRAWING FIGURES

FIG. 1 is a fragmentary partially diagramatic sectional view taken of a preferred form of the improved precombustion chamber structure shown in association with an internal combustion engine cylinder and piston.

FIG. 1a is a view taken on the line 1a—1a of FIG. 1 illustrating air deflecting vanes in an annular passage in an endwall of the chamber structure.

FIG. 1b is a fragmentary panoramic view taken at the line 1b—1b of FIG. 1a sectionally through several air deflecting vanes.

FIG. 2 is a fragmentary partially diagramatic sectional view of a second form of improved precombustion chamber structure.

FIG. 2a is a view taken on the line 2a—2a of FIG. 2 illustrating air deflecting vanes and a concavo-convex vortex flow control structure associated with an annular passage through an endwall of the chamber structure.

FIG. 2b is a fragmentary panoramic view taken at the line 2b—2b of FIG. 2a sectionally through several air deflecting vanes.

FIG. 3 is a fragmentary partially diagramatic sectional view taken of a third form of improved precombustion chamber structure.

FIG. 4 is a fragmentary partially diagramatic sectional view taken of a fourth form of the improved precombustion chamber structure.

FIG. 5 is a fragmentary panoramic view taken similarly to FIG. 1b of a modified chamber endwall in which the air deflecting vanes are replaced by non-air-deflecting radially-projecting ribs.

DESCRIPTION AND EXPLANATION OF THE ILLUSTRATED FORMS OF THE INVENTION

A precombustion chamber structure 10 constituting a preferred form of this invention is shown in FIG. 1 in the cylinder head 11 of a cylinder 12 which are parts of a 4-stroke cycle internal combustion engine 9. A piston 13 reciprocates conventionally in the cylinder to vary the volume of a variable volume space 14 in the cylinder between the piston and the cylinder head. The cylinder head contains an air intake passage 15, shown in dotted lines, communicating with the cylinder variable volume space 14 through an intake valve seat 16 when the head 17 of diagramatically shown intake valve 20 is unseated by a thrust force exerted through valve stem 18. Also contained in the cylinder head is an exhaust passage 19 communicative with the variable volume space through the seat 21 of a diagramatically shown exhaust valve 30 when its head 22 is unseated by a thrust force exerted through a valve stem 23.

The chamber structure 10 includes for enclosing the chamber 24 thereof a sidewall 25 generated circularly about a principal axis 26 and opposite endwalls 27 and 28 spaced apart axially of the chamber. Chamber 24 in volume can be approximately 1/7th of the maximum volume of the variable volume space 14 which occurs when the piston 13 is in its lowermost position. This would provide a typical compression ratio of 8 to 1. The uppermost position of piston 13 occurs when its crown 28a reaches the dotted line position which entails minimal clearance relatively to the cylinder head 11 so that at the end of the compression stroke a very high percentage of the compressed gaseous content will occupy the combustion chamber 24. Endwall 28, which is held in position by a snap ring 50, includes passage means 29 having a passage 31 annular in transverse section surrounding the axis 26 and communicating between the variable volume space 14 and the interior of chamber 24. This passage 31 is operable to conduct air and particles mixed therewith, as later explained, from space 14 into the chamber 24 pursuant to a compression stroke (upward as viewed in FIG. 1) of piston 13. Chamber 24 is composed of a principal portion 33 and a vestibule portion 34 comprising an elongated duct 35 annular in transverse section surrounding the axis 26. Said duct communicates at one end (upper end as viewed in FIG. 1) with the principal chamber portion 33 and includes at its other end the annular passage 31, causing this duct to extend endwise into communication with the space 14 and be operable to receive air and its contained particles from this space and to conduct at least a portion of such received air into the principal chamber portion pursuant to a compression stroke of piston 13.

The chamber sidewall 25 has an inwardly facing periphery 36 of the chamber principal portion 33 and an inwardly facing outer periphery 37 of the annular duct 35 of the chamber vestibule portion. Outer periphery 38 of passage 31 of passage means 29 constitutes an extension part of duct periphery 37. The elongated annular duct 35 has an inner periphery 39 facing outwardly in opposed spaced relation to the outer periphery 37. Inner periphery 41 of passage 31 constitutes an extension part of duct periphery 39. The annular passage 31 constituting a transverse section of the annular duct 35 contains and comprises a plurality of air deflecting vanes 42 spaced apart linearly of such duct section and angularly tilted in the same direction both axially and linearly relatively to such duct section. These vanes of the annular passage means 29 impart to the air conducted thereby from the variable volume space 14 a spiral motion about the axis 26, whereby due to confinement of the conducted air by the chamber sidewall, such air flows axially upwardly in the form of a vortex within the vestibule annular duct 35. Thus the passage means 29 and the chamber sidewall 25 are configured to cooperatively create of the conducted air a vortex encircling the axis 26 within the chamber 24 adjacently to its endwall 28.

Vortex flow control means 43 in the form of a cone-like structure disposed contiguously with the chamber endwall 28 and secured thereto by a screw 44 provides as part thereof a portion of the cone-like periphery 39 of the elongated annular duct 35, the remaining portion of such periphery being provided by the inner periphery 41 of passage 31. That part of the periphery 39 constituting a surface portion of vortex flow control means 43 extends from the one endwall 28 toward the other endwall 27 and transverse sections of this cone-like periphery diminish in perimeter as a direct function of their respective distance from the one endwall. Radially inner and outer surface portions of the annular column or vortex of air rotating within the annular vestibule duct 35 about the chamber axis tend to flow respectively the peripheries 39 and 37. This is a phenominon known as the Coanda effect which is defined in the Third Edition of Van Nostrand's Scientific Encyclopedia as follows: "The tendency of a jet of gas to follow the wall contour when discharged adjacent to a surface even when that surface curves away from the jet discharge axis is known as the Coanda effect". Because of this tendency of the radially inner portion of the vortex to follow the cone-like periphery 39 of the vortex flow control means 43, such periphery conduces convergence of at least a portion of the axially advancing vortex radially toward the axis 26. In this manner the vortex flow control means 43 causes a central core-like portion of the vortex to thrust sprirally upwardly from the apex 45 in opposition to and with somewhat neutralizing effect upon a reflux vortex thrust downwardly from the chamber endwall 27 along and closely around the chamber axis. The position and upward thrust of the core-like portion of the vortex are illustrated by the arrows A whereas the position and downward thrust of the reflux vortex are illustrated by the arrows B. The reflux vortex is created by air introduced into the principal chamber portion 33 by a part of the vortex entering such principal chamber portion advancing spirally upwardly contiguously with the inwardly facing periphery 36 thereof and upon reaching the chamber endwall 27 being deflected thereby downwardly contiguously about the chamber axis as explained in German Pat. No. 2715943 issued to Robert Bosch GmbH.

Because of this vortex flow control, downward movement of all parts of air initially in the chamber portion 33 and that of the vortex entering this chamber portion is effectively opposed by vortex air succeedingly into this chamber portion, wherefore the air initially in this chamber portion with fuel mixed therein, as later described, is compressed into a space of less volume adjacently to the chamber upper endwall. Successively later entering portions of the vortex are compressed into respective lower portions of chamber portion 33. Due to the kenetic fluidal character of this entire mass rotating about the chamber axis, there will be some interpenetration of axially adjacent portions, although axial migration is limited, and none of the air delivered upwardly past the apex 45 can flow back into that part of the vortex advancing upwardly in vestibule duct 35.

The chamber upper endwall 27 has centrally mounted therein a fuel injector 46 for injecting into the chamber a fuel such as gasoline or equivalent evaporative fuel adapted for spark ignition by an electric spark igniter 47 when mixed with air in proper amount. Igniting spark occurs between electrodes 48 and 49.

Air can enter the upper part of chamber 24 through an air inlet passage 51 past an air intake poppet valve 52 when it is opened by a downward thrust through valve stem 53 to unseat a a spring-seated valve head 54 from a valve seat 55. This valve 52, the intake and exhaust valves 20 and 30 respectively in the air intake and exhaust passages 15 and 19, the fuel injector 46 and the spark igniter 47 may be conventionally operated in timed sequence with movement of piston 13 which drives the engine crankshaft, not shown.

Operation of the engine parts thus far described is as follows: Starting with the downward air-intake stroke of piston 13 of this 4-stroke cycle engine, air is drawn into the variable volume space 14 through the then open intake valve 20. Exhaust valve 30 is closed at this time, but air inlet valve 52 is open during a sufficient part of the intake stroke to admit into combustion chamber 24 enough air to replace and discharge at least a substantial part of the products of the previous combustion through the annular duct 35 into the variable volume space 14. During the ensuing compression stroke of piston 13 the exhaust valve and both air intake valves are closed. Air in the contracting variable volume space is forced from this space past the air deflecting vanes 42 into the combustion chamber 24. As this air passes the vanes it is deflected thereby to flow helcially through the vestibule duct 35 in the form of a vortex spinning about the chamber axis 26. As successive transverse sections of this upwardly advancing vortex reach the apex 45 of the vortex flow control means 43 they become solid or disc-like in contrast to annular and become part of a fluidal mass rotating about the chamber axis. This rotating mass is compressed and forced upwardly in the principal chamber portion 33 by the upwardly advancing vortex in the vestibule duct 35 until completion of the piston compression stroke.

Fuel injection may occur during the air intake stroke and for a short time into the compression stroke. Fuel delivery through the injector is assumed to be at a constant rate. To attain full load operation, fuel injection may start at a predetermined time near start of the intake stroke. During this intake stroke the variable volume space 14 will be charged with air entering past intake valve 20 supplemented by air entering past inlet valve 52 and by way of combustion chamber 24 from which such air forces products of the preceding combustion into said space. The fuel which is injected in the form of a conical spray pattern such as 56 into the chamber will mix with and be borne by the air moving through the chamber into the variable volume space where it also mixes with air therein and with the combustion products forced from the combustion chamber. The fuel delivery rate will be such that upon completion of the intake stroke the variable volume space will have been charged with an amount of fuel which, when later supplemented in the combustion chamber by fuel contained in such chamber prior to ignition, will product maximum power for which the engine is rated. This amount of fuel in the variable volume space and the air mixed therewith, when compressed into the combustion chamber pursuant to the ensuing compression stroke, will constitute an air-fuel mixture sufficiently rich in fuel to support combustion.

Engine operation at selectable part loads is accomplished by starting fuel injection at later times during the intake stroke, thus incurring shorter injection time periods correlated with less injected fuel and less power output. With this mode of operation, irrespective of engine load magnitude, fuel injection started before termination of the air intake stroke will continue until start or even after start of the ensuing compression stroke to assure the presence of fuel in the combustion chamber at the start of compression. During the compression stroke when all of valves 20, 30 and 52 are closed, air initially in the combustion chamber 24 mixes with fuel contained therein and any injected thereinto following termination of the preceding intake stroke. This mixture will be that initially compressed upwardly to form the reliably spark-ignitable air-fuel mass enveloping the electrodes 48 and 49. Ignition will occur at or near termination of the compression stroke.

Now considering what occurs during engine operation under the condition of no-load at idling speed, adequate fuel may be provided by injection starting at or near start of the compression stroke. Injection may continue after intake stroke termination and into the compression stroke cycle long enough to ensure there being in the chamber an amount of fuel which when mixed with the chamber-contained air will provide therewith an air-fuel mixture sufficiently in fuel to be reliably spark-ignitable. This is significant because, as explained above, it is this mixture which is initially compressed upwardly in the chamber to form the spark-ignitable air-fuel mass enveloping the electrodes. At no time during the compression stroke will there be a significant amount of fuel in the variable volume space, wherefore the gaseous vortex advancing spirally upwardly in and through the vestibule annular duct 35 will be composed principally of air, containing combustion products for recycling, forced upwardly from said space. This vortex rotates and compresses the spark-ingitable air-fuel mixture upwardly in the form of a rotating mass enveloping electrodes 48 and 49 where the bulk of such mass remains until ignited. The energy obtained from burning this amount of fuel will be adequate to support no-load idle speed engine operation. At the time of ignition, that part of the chamber content below said air-fuel mass will consist principally of compressed air providing an excess of oxygen for efficient burning of the fuel particles, thus minimizing exhaust gas pollutants.

Engine operation during the compression stroke under partial and full load conditions differs from operation under no-load idle speed conditions, just described, only in the respect that at the beginning of the compression stroke the variable volume space will contain significant amounts of fuel mixed with the air therein respectively in proportion to the amounts of power to be developed. As in the case of no-load idle speed operation, fuel injection may stop when the combustion chamber has received an amount of fuel which, when mixed and compressed with air then in the chamber, will provide with such air an air-fuel mixture that is reliably spark-ignotable. As the compression stroke continues, fuel-laden air is forced from said space into the vestibule duct 35 where this fuel-laden air spirals upwardly in the form of said vortex to compress and position said reliably spark-ignitable mixture upwardly to form the spark-ignitable mass enveloping the electrodes. At the instant spark ignition occurs near completion of the compression stroke, that part of the chamber contents below the spark-ignitable mass during this part load operation will be relatively lean with fuel, so as in the case of no-load idle speed operation, there will be an excess of oxygen for efficient burning of fuel particles.

Segregation, in a combustion chamber, of an air-fuel mixture mass relatively to a principally-air mass containing less or no fuel is popularly termed "stratification". However, because of the kenetic fluidal character of these two masses, in practice, there is no thin cleavage-plane-like juncture between these masses, and, although there is interpenetration of these masses at such juncture, nevertheless efficient combustion occurs so long as a reliably spark-ignitable portion of the air-fuel mass envelops the ignitor electrodes for ignition thereby to establish a flame front to reach all fuel particles. This flame front of burning fuel advances spherically from the electrodes, increasing the temperature and pressure in the combustion chamber and thus forcing the resulting hot gases through the vestibule duct 35 into the variable volume space to force the piston downwardly in effecting the power stroke.

The preceding description of engine operation involving the intake, compression and power strokes, assumed a constant fuel delivery rate through the injector so the quantity of fuel delivered per injection is proportional to length of the injection period, and described conditions which occur and develop when the injection period length is changed by changing its starting time. Alternately, the injection period time length can be changed by changing its termination time or by changing both start and termination times of such period to vary the quantity of delivered fuel and engine power output.

During the exhaust stroke of piston 13 that immediately follows the power stroke, only the exhaust valve 30 will be open. Products of combustion will be exhausted from the variable volume space past such exhaust valve and eventually to the atmosphere. These combustion products in chamber 24 will remain there during the exhaust stroke. This is an operating characteristic that improves exhaust emissions control. The combustion products retained in this chamber amount to about ⅛th of the total, ⅞ths having been exhausted past the exhaust valve. However, as explained above, during the ensuing air intake stroke, in addition to the intake valve 20 being open, the inlet valve 52 opens, permitting air to enter the upper portion of the combustion chamber to replace and force the residue combustion products downwardly from this chamber into the variable volume space 14. Fuel injected into this replacement air near completion of the intake stroke and the beginning of the compression stroke is, during the ensuing compression stroke in the manner above described, compressed with this air to form the spark-ignitable air-fuel mass enveloping the electrodes. No significant amount of combustion products are present to dilute this spark-ignitable mass because, during the air intake stroke, the residue combustion products were swept from the combustion chamber into the variable volume space and replaced by air entering this chamber past the inlet valve 52. During the ensuing compression stroke these residue combustion products are transported within the air forced from the variable volume space through and into the vestibule duct 35 to form the lower mass in the combustion chamber preparatory to ignition. Pursuant to combustion that follows this ignition, these transported combustion products are again subjected to a combustion flame front, heat and pressure which causes at least part of the hydrocarbons and carbon monoxide thereof to oxidize, burn, and thus utilize their latent energy and avoid their exhaust in the form of atmosphereic pollutants.

The second form of the invention, illustrated in FIGS. 2, 2a and 2b, operates in the same environment as the corresponding parts in the FIGS. 1, 1a and 1b form. Parts in this second form that correspond to parts in the first form are designated by the same respective reference characters plus the suffix letter "a" as an expecient to avoid repetitive description. In this second invention form a concavo-convex frustoconical-like vortex flow control means or structure 58 replaces the cone-like vortex flow control means 43 of FIG. 1. The base of structure 58 is welded to the air deflecting vanes 42a in axial congruent registry with a line 59 encircling the chamber axis 26a in a position between and radially spaced from the passage peripheries 38a and 41a. Concentric cone-like peripheries 61 and 62 of structure 58 extend axially from chamber endwall 28a toward the other endwall, not shown, but corresponding to the endwall 27 in FIG. 1. Transverse sections of these peripheries progressively diminish in perimeter as a direct function of their respective distance from the one endwall 28a. Part of the air vortex flowing upwardly from the annular passage 31a passes through the flow control structure 58 while in contact with the radially inwardly facing periphery 61, while another part of such vortex flows upwardly in contact with the radially outwardly facing periphery 62 because of the Coanda effect described above. Thus each of these peripheries of the vortex control means 58 conduce convergence of a portion of the vortex radially toward the axis 26a, the inwardly facing periphery 61 doing so by deflection and the outwardly facing periphery 62 doing so by induction or Coanda effect. This vortex flow control produces upward air pressure at the center of the chamber portion 33a with somewhat the same effect as the cone-like vortex flow control means 43 as described above.

The third form or species of this improvement is illustrated in FIG. 3 where the parts corresponding to those of FIG. 1, 1a and 1b are designated by the same respective reference characters plus the suffix letter "b". Cone-like periphery 39b of vestibule duct 35b is concentric with frustocone-like inner and outer peripheries 63 and 64 of a concavo-convex frustocone-like structure 65 which constitutes vortex flow control means supplementary to such means 43b. Said structure 65, which surrounds axis 26b and is spaced radially from and between the cone-like periphery 39b and the chamber sidewall 25b is secured contiguously with the endwall 28b by welding to vanes 42b. Peripheries 39b, 63 and 64 conduce convergence of portions of the air vortex in annular duct 35b radially toward axis 26b, the inwardly facing periphery 63 doing so by deflection of the air passing in contact therewith and the outwardly facing peripheries 39b and 64 doing so by induction of the air passing in contact therewith. Thus directing part of the vortex of air or air-fuel mixture toward the radial center of the combustion chamber upper portion 33b has an effect corresponding to that described above with reference to FIG. 1, namely, opposing reflux downward flow within the rotating air-fuel mass in the chamber upper portion 33b.

FIG. 4 illustrates an improvement species differing from FIG. 1 species principally in the attitude of the inner and outer peripheries 38c and 41c of the endwall annular passage 31c. All parts of the FIG. 4 species corresponding to parts of the FIG. 1 species are identified by the same respctive reference characters plus the suffix letter "c". Peripheries 38c and 41c both converge axially upwardly resulting in a straighter flow course for the air or air-fuel mixture from the variable volume space into the upperchamber portion 33c and likewise reverse flow of the products of combustion from the chamber 24c into the variable volume space, resulting in less frictional heat loss from the gases traversing duct 35c and less mechanical power to force these gases through said duct. The crown of piston 13. FIG. 1, will require a recess to receive the downwardly projecting center portion of chamber structure endwall 28c.

FIG. 5 illustrates a modified form of combustion chamber endwall 28d substitutable for the corresponding endwall 28 of FIG. 1 and of the corresponding endwalls in the FIGS. 2, 3 and 4 embodiments. Since the structure of this modified form differs from the jest-mentioned endwalls only in the respect of converting the tilted air deflecting vanes to ribs 66 extending radially of such endwall and occupying respective planes common with the principal axis of such endwall as axis 26 in FIG. 1, the structure of this endwall appears clearly illustrated by the single fragmentary view corresponding to FIG. 1b. The ribs 66 permit passage of air into an associated chamber as 24, FIG. 1, without imparting helical motion to such air and therefore without creating an air vortex in the annular duct 35 and about the chamber axis 26 in the upper chamber portion 33. The transverse area of vestibule duct 35 is sufficiently restricted that a simple no-vortex air stream moving upwardly therein from the variable volume space pursuant to the piston compression stroke will be concentrated and moving at sufficient speed to prevent reflux of any part of an air-fuel mass in the chamber portion 33 penetrating into the duct. Therefore, with this arrangement, at part load, an air-fuel mass in the upper chamber portion can be maintained discrete from a fuel-free air mass in the vestibule portion of the combustion chamber and thus obtain some of the advantage of this invention.

I claim:

1. The process of forming a body comprised of a mass of combustible air-fuel mixture and an adjoining mass of air containing less fuel per unit of air than is in said mixture all within an internal combustion engine precombustion chamber having opposite ends spaced apart endwise of a principal axis of the chamber and through one of which ends the chamber communicates endwise thereof with an alternately expandable and contractable variable volume space in a cylinder of such engine, said process comprising the steps of introducing into said chamber air consisting of a leading portion which, during expansion of said space, is caused to flow from the chamber through the communicating end thereof into said space and also consisting of a trailing portion also introduced into said chamber where it exists at termination of such space expansion, introducing fuel into the chamber in such quantity and timed relation with the expansion and ensuing contraction of said space as to coexist in mixed relation with the trailing portion of the introduced air to form therewith sidd air-fuel mixture, then, during such ensuing contraction of said space, directing the flow of air from said space and into the chamber through the communicating end thereof while guiding at least a portion of such directed air internally of the chamber in the form of a tubular column extending lengthwise of and encircling said axis and internally transversely spaced from said axis adjacently to the one end of the chamber and internally axially tapered to advance convergingly toward said axis at a position thereon nearer to the other end of the chamber to compress the air-fuel mixture into a concentrated mass adjacently to the other end of the chamber attendant to establishing said column as at least a part of said adjoining air mass within the chamber, the process also including, within a period occurring during said space expansion and prior to the trailing air portion starting entry into the chamber, the step of introducing a supplement of fuel into the chamber to coexist and mix therein with a part of the leading air portion, thus causing the leading air portion to convey such fuel therewith into said space and subsequently return at least a part of such fuel therewith from the space into the chamber during the ensuing contraction of said space to provide the chambr with fuel supplementing that in the compressed air-fuel mixture, and the further step of varying the quantity of fuel introduced during said period to selectively determine power output of said engine.

2. The process of forming a body composed of a mass of combustible air-fuel mixture and an adjoining mass of air containing less fuel per unit of air than is in said mixture all within an internal combustion engine pre-combustion chamber having opposite ends spaced apart endwise of a principal axis of the chamber and through one of which ends the chamber communicates endwise thereof with an alternately expandable and contractable variable volume space in a cylinder of such engine, said process comprising the steps of introducing into said chamber air consisting of a leading portion which, during expansion of said space, is caused to flow from the chamber through the communicating end thereof into said space and also consisting of a trailing portion also introduced into said chamber where it exists at termination of such space expansion, introducing fuel into the chamber in such quantity and timed relation with the expansion and ensuing contraction of said space as to coexist in mixed relation with said trailing portion of the introduced air to form therewith said air-fuel mixture, then, during such ensuing contraction of said space, directing the flow of air from said space and into the chamber through the communicating end thereof while guiding at least a portion of such directed air internally of the chamber in the form of a tubular column extending lengthwise of and encircling said axis and internally transversely spaced from said axis adjacently to the communicating end of the chamber and externally axially tapered to advance coverginingly toward said axis to a position spaced at least substantially halfway from the communicating end of the chamber to the other end thereof and thus compress the air-fuel mixture into a concentrated mass adjacently to the other end of the chamber attendant to establishing said column as at least part of said adjoining air mass within the chamber.

3. A process as set forth in claim 1, wherein there is the further step of imparting to the tubular air column rotational motion about said axis and thus cause such column to spiral axially as it advances in the chamber.

4. A process as set forth in claim 1, wherein the period during which fuel is introduced into the leading air portion terminates near start of entry of the trailing air portion into the chamber.

5. A process as set forth in claim 4, wherein the quantity of fuel introduced into the chamber during such a period is selectively varied by altering the starting time and duration of such period.

* * * * *